April 10, 1934.   T. E. MOODIE   1,954,533
ROTOR HEAD FOR AIRCRAFT
Filed Oct. 26, 1931
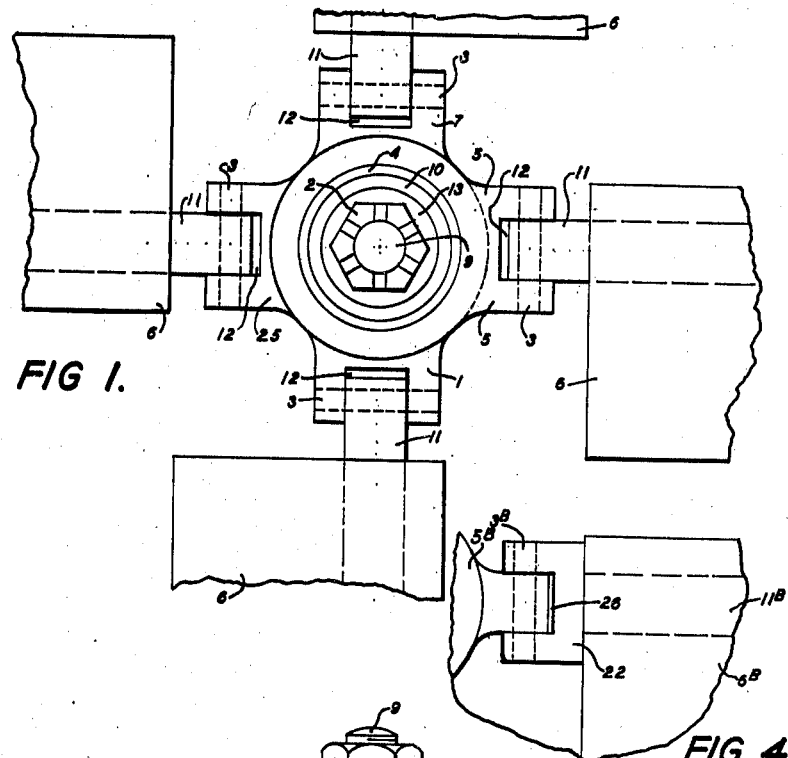
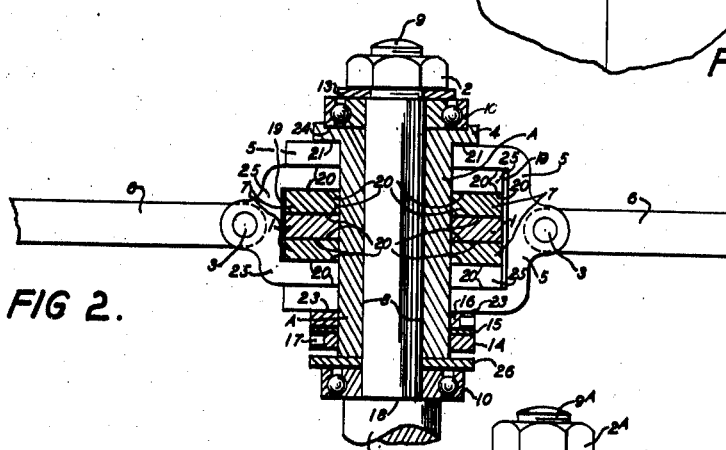
INVENTOR.
Thomas Edward Moodie
BY
Thomas Edward Moodie,
ATTORNEY.

Patented Apr. 10, 1934

1,954,533

UNITED STATES PATENT OFFICE 1,954,533

ROTOR HEAD FOR AIRCRAFT

Thomas Edward Moodie, Atlanta, Ga.

Application October 26, 1931, Serial No. 571,115

19 Claims. (Cl. 244—19)

Generically this invention relates to rotor-heads but it more especially comprehends the type adapted for use on the rotating wing type aircraft such as the helicopter, or autogiro, or similar machine.

One of the principal objects of this invention is the provision of a rotor-head structure for rotating wing aircraft of all types, freely rotatable about a vertical axis substantially at right angles to the longitudinal axis of the machine, composed of a central hub or spool, a plurality of rotor-blades or vanes including hinged anchor members adapted to encircle said central hub or spool, means for clamping said anchor members together whereby said anchor members and blades hingedly attached thereto may freely rotate with the aforementioned central hub or spool as a unit about the aforementioned vertical axis or the said anchor members and blades hingedly attached thereto may individually rotate or oscillate with respect to each other about said central hub or spool so that in case of breakage or detachment in flight, the remaining blades or portions thereof will so automatically adjust themselves with respect to each other as to maintain the machine in a condition of approximate balance. The blades are likewise free to oscillate independently of each other in a plane approximately perpendicular to the plane of their own rotation, but prevented from rotating or twisting about an axis parallel to their own length.

Another important object of this invention is the provision of a rotor head composed of a central hub or spool, improved anchor members encircling said central hub or spool and friction means associated therewith for normally maintaining the blades in their respective positions, so adjustable at the juncture of the anchor members and the central hub or spool that the oscillation of the anchor members and the blades hingedly attached thereto may be better controlled thereby eliminating the necessity of tying the blades together as has been heretofore prevalent.

A further object of this invention is the provision of improved blade anchor members each hingedly connected to one of the blades or vanes and formed with novel means for movable engagement with the rotor-hub or spool, said members designed for frictional engagement with each other and with the adjustable friction elements of the hub, and coacting with the hub to prevent twisting of the blades about an axis parallel to their own length.

With these and other objects in view which will become apparent as the description proceeds, the invention resides in the construction, combination, and arrangement of parts, hereinafter more fully described and claimed and illustrated in the accompanying drawing in which like characters of reference indicate like parts throughout the several figures, of which:

Figure 1 is a plan view of the rotor-head and blades with blades broken away.

Figure 2 is a cross-section of Figure 1 with parts in elevation.

Figure 3 is a fragmentary cross-section view of a modified form of anchor member and hub with the parts in elevation.

Figure 4 is a fragmentary plan view of a portion of a blade and anchor member with modified form of hinge attachment.

In heavier-than-air aircraft construction of the rotative wing type where the rotor constitutes an aerodynamic surface, comprising a series of rotating blades, said blades deriving the power for their rotation from the air reactions thereon produced by the movement of the machine, the angularly disposed centrifugal and lift forces cause a gyratory action of the hinged blades during their rotative travel and the effective angle of attack of the blades varies so that they will each carry their proper share of the lift and thus avoid any asymmetry of lift on opposed blades due to differences in velocity of the relative wind thereon, thereby establishing stability, the construction of the rotor-head becomes of prime importance, as it forms the supporting connection between the rotor and the machine and must be especially adapted to withstand the stresses incident to the above operation of the rotor transmitted through it to the balance of the machine while at the same time permitting free movement of the blades with respect to each other. Therefore, it was to overcome the deficiencies of the types of rotor-heads heretofore in use and to provide a structure peculiarly adapted to anchor the articulating blades comprising an annular hub member rotatably mounted on ball bearings on an approximately vertical shaft and formed with a collar or shoulder at its upper end, a plurality of anchor members hingedly connected to respective blades and adapted to encircle said hub and also be embraced one by the other, threaded collar and lock nut or other adjustable means attached to the lower part of said hub whereby the frictional contact between the respective anchor members and likewise between the outside anchor members and the hub may be varied so that the anchor members and the hinged blades attached thereto are normally maintained in proper spaced relation at the same time permitting their relative movement with respect to each other, so that, irrespective of the number or damaged condition, the blades or portions thereof will automatically adjust themselves with respect to each other so as to maintain the machine in approximate balance, that I designed the rotor-head structure forming the subject matter of this invention.

In the illustrated embodiment characterizing this invention there is shown a hub or spool A formed on its upper end with a collar or shoulder 4 and at its lower end with threads (not shown) to receive collar 16, said collar 16 being locked to hub A by means of washer 15 and similar collar or nut 14 which is likewise threadedly engageable with hub A. Said collar 16 in conjunction with washer 15 and nut 14 are adapted to effect relative adjustment between the surfaces 23 and 21 with respect to each other and for a purpose hereinafter more fully appearing.

Hub A is formed with a central aperture 8 adapted to receive shaft 9 on which it is rotatably journaled in ball bearings 10, the upper bearing seating in countersunk portion 24, formed in the upper surfaces of the collar 4, the lower bearing 10 seating directly on the shoulder 18 of shaft 9 surmounted by washer or collar 26 which is in direct contact with the lower extremity of the hub A. The assembly is locked in position by washer 13 and nut 2 threadedly engageable with the free end of said shaft, as will be clear without further explanation.

A rotor comprising a plurality of blades or vanes 6 each formed with a shaft member 11 located approximately at the quarter chord point or at a point corresponding to the constant location of the center of pressure of the blade or vane in question, the free end of said shaft being adapted to engage slot 12 formed in one end of anchor members 1, 5, 7, and 25 respectively, hingedly connected thereto by pin 3 extending transversely through the said anchor members and shaft. In the preferred form, anchor member 5 encircles hub A and has its upper surface 21 in frictional contact with shoulder 4 of hub A and its lower surface 23 in frictional contact with the collar 16 before mentioned. Anchor member 5 embraces all other anchor members 1, 7, and 25 but is not itself embraced by any of the said anchor members. Anchor member 25 encircles hub A and embraces anchor members 1 and 7 and is itself embraced by anchor member 5, its inner and outer surfaces 20 on both its arms are in frictional engagement with the inner surface 20 of anchor member 5 and the outer surfaces 20 of anchor member 7. Anchor member 7 encircles the hub A and embraces anchor member 1, it is itself embraced by anchor member 25 which is in turn embraced by anchor member 5 before mentioned. The outer and inner surfaces 20 of anchor member 7 are in frictional contact with the inner surface 20 of anchor member 25 and the outer surface 20 of anchor member 1. Anchor member 1 encircles the hub A and is embraced by all the other anchor members 7, 25, and 5. The upper and lower surfaces 20 of anchor member 1 are in frictional contact with the inner surfaces 20 of anchor member 7.

Referring to figures not previously mentioned, 17 represents a hole or series of holes in collar 16 and collar or nut 14 for the insertion of a bar or rod, said bar or rod being used to effect the adjustment of said parts; 19 refers to the opening between the arms of anchor members 5, 25, and 7 (not shown).

It will thus be seen that the vanes or wings 6 including their articulating anchor members 5, 7, 1 and 25 and hub A are free to rotate about a central axis or shaft 9, and that said wing structures and anchor members hingedly attached thereto are also freely and individually rotatable circumferentially of said hub and with respect to each other in the same plane, except as restricted by said adjustable friction means, and said anchor members co-acting therewith are so constructed with respect to said hub as to prevent rotation or twisting of the wings about their longitudinal axes.

In varying types of aircraft and corresponding operating requirements it may be found expedient to slightly vary the arrangement of the connection between the rotor-head or hub and the blade anchor members, without, however, departing from the principle of the form above described, and one modified form is illustrated in Figure 3, wherein hub $A^a$ is similar to hub A except that it is somewhat shorter and more compact. The anchor members $5^a$, $25^a$, $7^a$, and $1^a$ do not, in this form of construction, embrace one another but are simply placed one above the other in the proper order and are bent down at their outer extremities so that the axes of the transverse hinge pins 3 will all be in a plane which is perpendicular to the central shaft and which passes approximately through the center of the hub member $A^a$. In this form of construction it will be noted that the anchor members $5^a$ and $25^a$ are similar and that anchor members $7^a$ and $1^a$ are likewise similar. With the exceptions above referred to this form of construction is the same as the preferred form before described, like parts or similar parts being referred to by the same reference numbers as in the preferred form and performing the same or similar functions.

Fig. 4 illustrates an alternative type of hinge pin attachment which may be applied to either the preferred form Fig. 1 and Fig. 2 or the modified form Fig. 3. In this type of hinge attachment, Fig. 4, the shaft member $11b$ is fitted at its inner extremity with a boss 22 constructed with a slot 26 which embraces the anchor member $5b$. In the other form of hinge pin attachment, Figs. 1, 2, and 3, the anchor members 5, 25, 7, and 1 or $5^a$, $25^a$, $7^a$ and $1^a$ are constructed with a slot 12 so that they embrace the shaft members 11 or $11^a$ as the case may be. With the exception above referred to the form of hinge pin attachment illustrated in Fig. 4 is the same as that shown in Figs. 1, 2, and 3. With the aid of the above description and attached drawing, the operation of the device should be fully understood without further explanation.

While the operation of the device would seem to be clear from the above description, it might be well to further state that the blades and anchor members hingedly attached thereto are freely rotatable as a unit, with the hub A about the shaft 9 as an axis, under the aerodynamical pressure of the air produced by the movement of the machine. The blades and hinged anchor members attached thereto are likewise individually rotatable with respect to each other about the aforementioned central hub or spool A subject to the frictional restraint imposed by the surfaces 20, 21, and 23, when clamped together by the collar 16, whereby the necessity for tying the blades together is eliminated, and should a blade break or become detached during flight, the remaining blades or portions thereof will automatically so distribute themselves with respect to the rotor-head as to maintain the craft in approximate balance.

From the above it will be apparent that I have designed a novel rotor-head structure for aircraft comprising a central hub member, a plurality of blade anchor members hingedly connected to the respective blades, means for rotatively connecting the anchor members to the hub and adjustable means carried by said hub co-acting with said anchor member for restricting their rotative movement with respect to said hub, said device comprising few parts, simple in construction, manufacturable at a reasonable cost, and efficient for the purpose intended.

Although in practice I have found that the form of my invention illustrated in the accompanying drawing and referred to in the above description as the preferred embodiment, is the most efficient and practical; yet realizing the conditions concurrent with the adoption of my invention will necessarily vary, I desire to emphasize that various minor changes in details of construction, proportion, and arrangement of parts, may be resorted to within the scope of the appended claims without departing from or sacrificing any of the principles of this invention.

Having thus described my invention, what I desire protected by Letters Patent is as set forth in the following claims:

1. In aircraft, the combination with a plurality of freely rotative blades adapted to be driven by the air flow across them in flight and a centrally disposed shaft, of a rotor-head rotatable on said shaft, a plurality of anchor members each hingedly connected to a respective blade, means for rotatably connecting the anchor members to the rotor-head and adjustable means for restricting the rotative movement of the anchor members with respect to said rotor-head whereby said blades and rotor-head are rotatable about said shaft and said blades rotatable with respect to the rotor-head and each other, so that irrespective of the loss of a blade or portion thereof in flight, the remaining blades or portions thereof will so automatically adjust themselves with respect to said rotor-head and each other as to maintain the craft in approximate balance.

2. In aircraft, the combination with a plurality of freely rotative blades adapted to be driven by the air reactions thereon in flight and a centrally disposed shaft, of a rotor-head mounted on said shaft, a plurality of anchor members each hingedly connected to a respective blade, means for rotatively connecting the anchor members to the rotor-head and adjustable means carried by the rotor-head, co-acting with said anchor members for restricting their rotative movement with respect to the rotor-head, whereby the blades are normally equi-spaced and axially disposed about said rotor-head and upon the loss of a blade or portion thereof, the remaining blades or portions thereof will so automatically adjust themselves with respect to said rotor-head and each other as to maintain the craft in approximate balance.

3. In aircraft, the combination with a plurality of freely rotative blades adapted to be driven by the air reactions thereon in flight and a centrally disposed shaft, of a central hub mounted on said shaft, a plurality of anchor members each hingedly connected to a respective blade and encircling said hub and rotatable thereon, means carried by said hub for frictionally restricting or limiting the rotation of said anchor members with respect to said hub whereby the blades are rotatable about said central shaft and rotatable with respect to said hub and each other to effect their automatic distribution about said hub irrespective of the removal of a blade or portion thereof.

4. In aircraft, the combination with a plurality of freely rotative blades adapted to be driven by the air flow across them in flight, and a centrally disposed shaft, of a rotor-head mounted on said shaft, a plurality of anchor members, each hingedly connected to a respective blade, means for rotatably connecting the anchor members to the rotor-head means for restricting rotation of said anchor members with respect to said rotor-head whereby the blades are restrictively rotatable with respect to said rotor-head and each other and likewise freely rotatable with said hub and anchor members as a unit about the aforementioned central shaft.

5. In aircraft, the combination with a plurality of freely rotative blades adapted to be driven by the air flow across them in flight, a centrally disposed shaft, of a rotor-head mounted on said shaft, a plurality of anchor members each hingedly connected to a respective blade, means for rotatably connecting the anchor members to the rotor-head whereby the blades are rotatable with respect to said rotor-head means for restricting the rotation of said anchor members with respect to said rotor-head and each other but are restrictively prevented from rotating about an axis parallel to their own length.

6. In aircraft, the combination with a plurality of freely rotative blades adapted to be driven by the air flow across them in flight and a centrally disposed shaft, of a central rotor-head or hub mounted on said shaft formed with a fixed or adjustable collar or shoulder at its upper end and with a fixed or adjustable collar or shoulder at its lower end so that a plurality of anchor members each hingedly connected to a respective blade can encircle said hub between said shoulders or collars and be subject to a certain degree of frictional restraint due to the relative adjustment of said shoulders or collars, said blades being rotatable about said shaft and rotatable about said hub and automatically adjustable with respect to each other in flight.

7. In aircraft, the combination with a plurality of freely rotative blades adapted to be driven by the air flow across them in flight and a centrally disposed shaft, of a rotor-head or hub mounted on said shaft formed with shoulders or collars at its upper and lower ends, a plurality of anchor members, each hingedly connected to a respective blade, means carried by said anchor members for securing themselves to said hub rotatively with respect thereto and means for frictionally adjusting the said shoulders or collars with respect to said anchor members.

8. In aircraft, the combination with a plurality of freely rotative blades adapted to be driven by the air flow across them in flight, of a central rotor-head, a plurality of anchor members each hingedly connected to a respective rotor-head blade means rotatively connecting the anchor members to said rotor-head, whereby the blades, anchor members, and rotor-head and friction means coacting with said rotor-head and said anchor members are freely rotatable as a unit about a central axis and at the same time the blades and anchor members hingedly attached thereto are restrictively and individually rotatable about said central rotor-head.

9. In aircraft, the combination with a plurality of freely rotative blades adapted to be driven by the air flow across them in flight, a central rotor-head, a plurality of anchor members each hingedly connected to a respective rotor blade and friction means rotatively connecting the anchor members to said rotor-head whereby the blades, anchor members, and rotor-head are freely rotatable as a unit about a central axis and at the same time the blades and anchor members hingedly attached thereto are individually and restrictively rotatable about said central rotor-head.

10. In aircraft, the combination with a plurality of freely rotative blades adapted to be driven by the air flow across them in flight, a central rotor-head, a plurality of anchor members each hingedly connected to a respective rotor blade and friction means rotatively connecting the anchor members to said rotor-head whereby the blades, anchor members, and rotor-head are freely rotatable as a unit about a central axis and at the same time the blades and anchor members hingedly attached thereto are individually and restrictively rotatable about said central axis.

11. In aircraft, the combination with a plurality of freely rotative blades adapted to be driven by the air flow across them in flight, a central rotor-head, a plurality of anchor members each hingedly connected to a respective rotor blade and friction means rotatively connecting the anchor members to said rotor-head whereby the blades, anchor members, and rotor-head are freely rotatable as a unit about a central axis and at the same time the blades and anchor members hingedly attached thereto are individually and restrictively rotatable about said central axis, the blades being freely and individually rotatable about the aforementioned hinge joint attaching them to said anchor members.

12. In aircraft, the combination with a plurality of freely rotative blades adapted to be driven by the air reactions thereon in flight, and a centrally disposed shaft; a rotor-head freely rotatable on said shaft, comprising a hub or spool formed at its upper and lower ends with shoulders or collars, a plurality of anchor members each hingedly attached to a respective blade and confined between said collars and encircling said hub, said anchor members so symmetrically formed and placed that they embrace or are embraced one by the other in such order that the hinge pins by which they are attached to the blades will all lie in the same plane, said anchor members having their adjacent surfaces held in frictional contact with each other by means of the collars or shoulders above referred to so that they are freely rotatable as a unit with said hub and blades about said central shaft and are likewise individually and restrictively rotatable about said central hub or spool, said blades being freely and individually rotatable about said hinged connection but prevented by said anchor members and hub acting in conjunction therewith from rotating or twisting about their own longitudinal axes.

13. In aircraft, the combination of a plurality of freely rotative blades adapted to be driven by the air reactions thereon in flight, and a centrally disposed shaft, of a rotor-head formed of a hub or spool and formed at its upper and lower ends with shoulders or collars, a plurality of anchor members each hingedly attached to a respective blade, inserted between said collars and encircling said hub, said anchor members being slightly bent at their outer ends so that the hinge pins by which they are attached to the respective blades will all lie approximately in the same plane, said anchor members having their adjacent surfaces held in frictional contact with each other by means of the collars or shoulders above referred to so that they are freely rotatable as a unit with said hub and blades about said central shaft and are likewise individually and restrictively rotatable about said central hub or spool, said blades being freely and individually rotatable about said hinged connections but prevented by said anchor members and hub acting in conjunction therewith from rotating about their own longitudinal axes.

14. In aircraft a centrally disposed shaft or journal, a hub or bearing rotatably mounted thereon, a plurality of rings encircling said hub or bearing and individually rotatable thereon and circumferentially with respect thereto, friction means coacting with said hub or bearing and said rings restricting their circumferential motion, wings or blades hinge jointed to said rings.

15. In aircraft a centrally disposed shaft or journal, a hub or bearing rotatably mounted thereon, a plurality of rings encircling said hub or bearing and individually rotatable thereon and circumferentially with respect thereto, friction means coacting with said hub or bearing and said rings restricting their circumferential motion, wings or blades flexibly joined to said rings.

16. In aircraft a centrally disposed shaft or journal, a hub or bearing rotatably mounted thereon, a plurality of rings encircling said hub or bearing and individually rotatable thereon and circumferentially with respect thereto, friction means coacting with said hub or bearing and said rings restricting their circumferential motion means for attaching said wings or blades to said rings.

17. In aircraft a combination with the plurality of freely rotative blades adapted to be driven by the air reactions thereon in flight and a centrally disposed shaft, of a central hub mounted on said shaft, a plurality of anchor members, each connected to a respective blade and encircling said hub and rotatable thereon, means carried by said hub for frictionally restricting or limiting the rotation of said anchor members with respect to said hub whereby the blades are rotatable about said central shaft and rotatable with respect to said hub and each other, to effect their automatic distribution about said hub irrespective of the removal of a blade or portion thereof.

18. In aircraft the combination with the plurality of freely rotative blades adapted to be driven by the air flow across them in flight and a centrally disposed shaft, of a central rotor-head or hub mounted on said shaft, formed with a fixed or adjustable collar or shoulder at its upper end and with a fixed or adjustable collar or shoulder at its lower end, so that a plurality of anchor members, each connected to a respective blade, can encircle said hub between said shoulders or collars and be subject to a certain degree of frictional restraint due to the relative adjustment of said shoulders or collars, said blades being rotatable about said shaft and rotatable about said hub and automatically adjustable with respect to each other in flight.

19. In aircraft the combination with the plurality of freely rotative blades adapted to be driven by the air flow across them in flight and a centrally disposed shaft, of a rotor-head or hub mounted on said shaft formed with shoulders or collars at its upper and lower ends, a plurality of anchor members each connected to a respective blade and means carried by said anchor members for securing themselves to said hub rotatably with respect thereto and means for frictionally adjusting the said shoulders or collars with respect to said anchor members.

THOMAS EDWARD MOODIE.